United States Patent [19]

Inoue

[11] 4,310,241

[45] Jan. 12, 1982

[54] SYSTEM FOR CONTROLLING AN ORIGINAL IMAGE SCANNING FOR USE IN SLIT EXPOSURE TYPE IMAGE RECORDING APPARATUS

[75] Inventor: Kazuya Inoue, Musashino, Japan

[73] Assignee: Katsuragawa Electric Co., Ltd., Tokyo, Japan

[21] Appl. No.: 121,360

[22] Filed: Feb. 14, 1980

[30] Foreign Application Priority Data

Feb. 14, 1979 [JP] Japan .................................. 54-16475

[51] Int. Cl.$^3$ ...................... G03B 27/32; G03G 15/28
[52] U.S. Cl. .......................................... 355/60; 355/8
[58] Field of Search ................... 355/8, 11, 48, 49, 50, 355/51, 55-63

[56] References Cited

U.S. PATENT DOCUMENTS

3,598,489  8/1971  Thomas et al. .................. 355/57 X
4,120,578 10/1978  Daniels et al. .................... 355/57 X
4,211,482  7/1980  Arai et al. ......................... 355/57 X Primary Examiner—L. T. Hix
Assistant Examiner—W. J. Brady
Attorney, Agent, or Firm—Martin Novack

[57] ABSTRACT

A system for controlling an original image scanning for use in a slit exposure type image recording apparatus adapted to project an original image through slit exposure over an image recording medium moving at a predetermined speed, which comprises an oscillating means for generating an output of a predetermined frequency, a first pulse counting means supplied with the output from said oscillating means and a magnification data corresponding to a desired image magnification ratio and generating output pulses of a predetermined frequency, a power amplifying means receiving said output pulses from said first pulse counting means and generating a power output of a predetermined frequency corresponding thereto, and a synchronous motor for conducting the original image scanning while driven by the power output from said power amplifying means.

22 Claims, 4 Drawing Figures

SYSTEM FOR CONTROLLING AN ORIGINAL IMAGE SCANNING FOR USE IN SLIT EXPOSURE TYPE IMAGE RECORDING APPARATUS

BACKGROUND OF THE INVENTION

This invention relates to a system for controlling original image scanning for use in a slit exposure type image recording apparatus and, more particularly, to a system for controlling an original image scanning for use in a slit exposure type copying machine or printer with provision for a movable original image and a fixed optical system or for a fixed original image and a movable optical system.

In such a type of copying machine or printer, there is provided a variable magnification device for adjusting the magnification or enlargement of an entire copy image relative to the original image by varying the focal length of the lens of the optical system or the total optical path length thereof, thereby providing a different enlargement of the copy image. In this case, and dependent upon the setting of the magnification ratio, it will be necessary to adjust the magnification in the direction of forwarding the copy image relative to its original image or the longitudinal magnification by varying the rate of movement of the original image or optical system during the original image projection (such movement being herein referred to as original image scanning). Especially in a printer using a microfilm of 35 mm size, it is fundamental to use a microfilm image having a reduction of 1/15 in size as an original image and produce a copy image of practical size magnified or enlarged by 15 times from the original image. It is, however, desired that the same original image be enlarged by 10½ times and then copied on paper having a size ½ smaller than the full scale size of paper. For example, an original drawing of A2-size is reduced to provide a copy image of A3-size. It is further required that since there are used various types of microfilms having different ratios of image reduction and apparatus for producing microfilms would have differences up to about several percent in their reduction in size, the magnification of the printers needs to be finely adjusted to compensate for the differences and errors in the ratio of reduction, thereby producing the desired size of copy images.

In this case, the magnification in the direction of the image scanning (hereinafter referred to as longitudinal magnification) is given by dividing by the original scanning speed the surface speed of an image recording material or photosensitive material on which the original image is projected to form a copy image thereon. In ordinary printers in each of which the photosensitive material is moved at a predetermined speed, the original scanning speed is adjusted to vary the longitudinal magnification in order to satisfy the above-mentioned requirements. In conventional printers, however, it has been impossible to satisfy such requirements, because each of the printers is arranged such that a cylindrical drum having the photosensitive material on its surface is rotated at a predetermined speed and its rotational motion is converted to a linear motion through, for example, a pulley transmission device and a belt to achieve the original scanning and thus the original scanning speed or longitudinal magnification corresponding to the transmission step of the transmission device can only be selected.

Furthermore, the microfilm is taken such that the center of the original image is positioned at the center of the photographed portion of the film irrespective of the size of the original image and thus it is necessary to vary the initial position of the original image scanning dependent upon the size of the original image. Thus, there is a drawback that the device for this purpose is complicated in construction.

SUMMARY OF THE INVENTION

The present invention has for its object to satisfy the above-mentioned requirements and provide a system for controlling an original image scanning for use in the above-described type of the copy machine or printer, in a simple and convenient form, wherein the drawbacks of conventional apparatuses are removed.

DESCRIPTION OF THE PREFERRED EMBODIMENT

Figure 1:
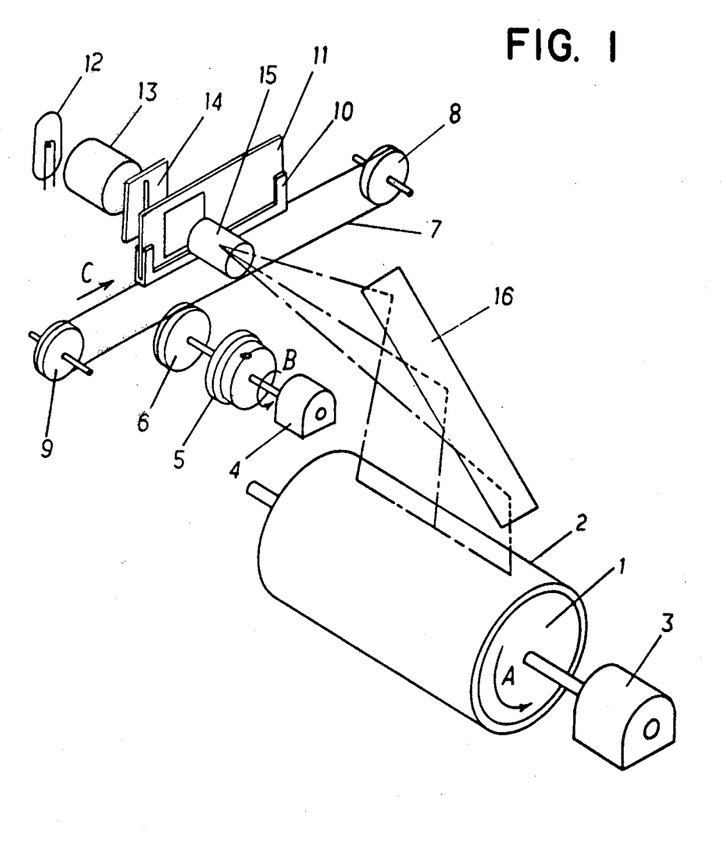
FIG. 1 is a schematic perspective view of the essential part of an example of a microfilm printer to which a system for controlling an original image scanning in accordance with the present invention is applicable.

Referring first to FIG. 1 of the drawings, there is shown an essential part of a microfilm printer to which the system for controlling an original image scanning of the present invention is applicable. This printer has rotatably provided a cylindrical drum 1, the peripheral surface of which is attached with a suitable electrophotographic photosensitive material 2, the drum 1 being rotated at a predetermined speed in a direction of an arrow A by a synchronous motor 3 which, in this case, is drivingly connected to a power source of commercial frequency.

There is further provided a second synchronous motor 4, the rotary shaft of which is connected to a driving part of an electromagnetic coupling 5, and a driven part of the coupling 5 is connected to a pulley 6. Extending around the pulley 6 is a belt 7 which is also stretched across a pair of spaced pulleys 8 and 9 in such a manner that when the motor 4 and the coupling 5 are energized to rotate the shaft of the motor 4 in a direction of an arrow B as will be described below, the upper run of the belt 7 is horizontally and linearly moved in a direction of an arrow C. Fixed to the upper run of the belt 7 is an aperture card carriage 10 which is movable together with the belt and carries an aperture card 11 attached with a microfilm to be copied.

An optical system of this apparatus comprises a lamp 12, a condenser lens 13, a slit member 14 having a vertical slit, a projecting lens 15, a mirror 16 and the arrangement being such that the light from the lamp 12 passes through the lens 13 and the slit member 14 to form a vertical web-like beam of light to be projected to the microfilm on one side surface of the aperture card and its light image as the original image is magnified by the lens 15 and then reflected by the mirror 16 to be projected to the photosensitive material 2.

In operation, the motors 3 and 4 are energized to rotate the drum 1 and the driving part of the coupling 5 at the predetermined speeds, respectively. When the coupling 5 is energized in timed relationship with other parts of the printer to couple its driven part to the driving part, the pulley 6 is rotated to move the belt 7 in the direction of the arrow C such that the microfilm of the aperture card 11 supported on the carriage 10 is moved across the optical path extending from the slit member 14 to the lens 15 and thus the image on the microfilm is successively and continuously projected to the photosensitive material 2 so as to achieve the original image scanning. When the original image scanning is complete, the lamp 12 and the coupling 5 are de-energized and the belt 7 is moved back by suitable means, such as spring force, in the opposite direction to return the carriage 10 to the initial position.

The light image projected to the photosensitive material 2 is converted to an electrostatic image by a suitable electrophotographic system, such as one disclosed in U.S. Pat. No. 3,536,483 to Watanabe et al. issued Oct. 27, 1970, and it is then visualized by, for example, a developing device (not shown) using known toner and the visualized image is transferred to suitable paper and then fixed thereto to form a copy image, and on the other hand the photosensitive material 2 is cleaned for repeated use.

Figure 2:
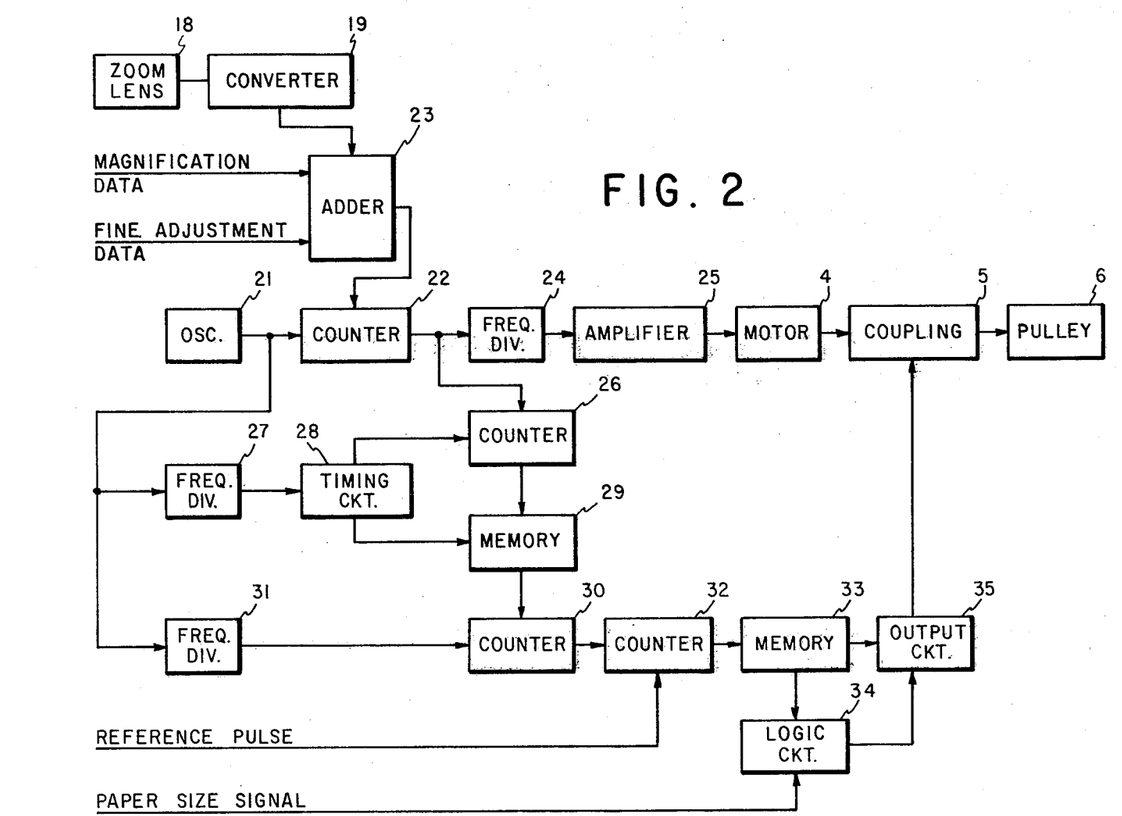
FIG. 2 is a block diagram of an embodiment of the system of the present invention.

FIG. 2 is a block diagram showing an embodiment of the system for controlling the original image scanning in accordance with the present invention. For simplicity, it is now described to apply this control system to a microfilm printer in which a microfilm having an image reduced to 1/15 in size can be used as an original to produce a copy image magnified by 15 times or 10 times thereof. In this case, it is assumed that the synchronous motor 3 for driving the photosensitive drum 1 of the printer is designed to be driven by the power from an electric source having a frequency of 50 Hz.

In FIG. 2, a reference numeral 21 designates a crystal oscillator having an oscillation frequency of 1 MHz, the output of which is supplied to a counter 22. In the case that the magnification of copy is 15 times, a digital data signal 950, as expressed by the binary coded decimal notation (hereinafter referred to as BCD) as magnification data, and a digital data signal of BCD 50, as fine adjustment data, are added by an adder 23 to produce a digital data signal of BCD 1000 which is, in turn, supplied to the counter 22. Thus, the counter 22 produces its output of 1000 pulses per second (1000 pps) which is, in turn, supplied through a 1/10 frequency divider 24 to be reduced to 100 pps and then supplied to an input terminal of a power amplifier 25 which supplies its output power of 50 Hz frequency to the synchronous motor 4 to drive the latter at a predetermined speed.

The output of the counter 22 is also supplied to a counter 26. The output of the oscillator 21 is converted by a 1/1,000,000 frequency divider 27 to a signal of 1 pps which is, in turn, supplied through a timing circuit 28 to the counter 26 so that the counting result of the counter 26 is 1000 in this example and is supplied to a data latch 29. The data latch 29 supplies data of numerical value of 1000 under the control of a signal derived from a counter 30. The output of the oscillator 21 passes through a 6/50 frequency divider 31 so as to be converted to a signal of 120,000 pps which is, in turn, supplied to the counter 30 to cause the latter to forward an output signal of 120 pps to a counter 32.

The counter 32 receives a reference pulse generated at a time when the photosensitive drum 1 passes through a reference position during a copy cycle, and then the counter counts the input pulses from the counter 30 and supplies the counted value as an address input signal to a memory (ROM) 33. Written in the memory 33 are data of the times of initiating and terminating the original image scanning suitable for the various paper sizes and the copy paper sizes for maintaining the image centering.

In the printer of this example, in the event that A2-, A3- and A4-sizes of paper are used, data of three bits are written on a determined address including two bits having binary digits 01, 10 and 11 for the data of A2-, A3- and A4-sizes of paper, respectively, and one bit for the original image scanning initiation and termination data. In this example, the timing of initiating the original image scanning is set at the hundredth count (decimal notation) after the counter 32 has received the reference pulse, and the address (sexadecimal notation) of the memory 33 at that time is 64H wherein there are written 01 for the paper size data (binary notation) and 1 for the original image scanning initiation data (binary notation). The termination of the original image scanning for A2-size of paper occurs at the eight hundredth count of the counter 32 and the address of the memory 33 at this time is 320H wherein there are written 01 for the paper size data and 0 for the original image scanning termination data. Similarly, the data for the A3- and A4-sizes of paper are written in the memory 33 at appropriate addresses. In the other addresses, there is written 00 for the paper size data to avoid false operation.

In operation, when a switch of the printer closes for selecting the A2-size of paper, a signal for the A2-size of paper is supplied to a logical circuit 34 which, in turn, compares that signal with the paper size data in sequence, and when those signals coincide with each other at the hundredth count of the counter 32, the contents of the latch of an output circuit 35 are renewed in correspondence with the original image scanning initiation data from the memory 33 to generate an output in the output circuit 35 for operating the coupling 5. Thereafter, the paper size data from the memory 33 at the eight hundredth count coincides with the signal which is being supplied from the A2-size selecting switch to the logical circuit 34, and at this time the contents of the latch of the output circuit 35 are changed by the original image scanning terminating data supplied from the memory 33 to the output circuit 35 to render the coupling 5 non-operative.

In this manner, the output circuit 35 supplies its output to the electromagnetic coupling 5 at an optimum time for the selected size of the copy paper to operate the coupling 5 thereby permitting the latter to transmit the rotational force of the synchronous motor 4 rotating at a determined speed to the pulley 6 (FIG. 1) to move the carriage 10 through the belt 7 in the direction of the arrow C, so that the original image of the microfilm on the aperture card 11 supported on the carriage 10 will be projected to the photosensitive material 2 as described hereinbefore to make the intended original image scanning, and then the output of the output circuit 35 is shut off to open the coupling 5 thereby interrupting the driving force from the motor 4 to the pulley 6. Thereafter, the pulley 6 is rotated under the action of the spring in the opposite direction to return the carriage 10 to the initial position.

In the case of producing a copy image magnified by 10 times larger than the original image of the microfilm, the magnification data of BCD 616 and the fine adjustment data of BCD 50 are supplied to the adder 23 so as to put therefrom data of BCD 666 into the counter 22. Thus, the counter 22 supplies an output signal of 1501.5 pps to the frequency divider 24 which, in turn, feeds an output of 150.15 pps to the power amplifier 25, and the latter supplies a power of frequency of 75.075 Hz to the synchronous motor 4 to rotate it at a speed 1.5 times higher than that in case of the copy operation of 15 times magnification.

At the same time, the output signal of the counter 22 affects the counter 30 through the counter 26 and the memory 29 in such a manner as is in the above mentioned example, thereby generating the output of 79.95 pps in the counter 30, and this output is fed as an input to the counter 32. The counter 32 receives such a reference pulse as is described above, counts the input pulses derived from the counter 30 and supplies the counted value as an address signal to the memory 33. The reference pulse is always generated at a determined time with respect to the position of the drum 1 irrespective of the copy magnification.

The memory 33 receives the signal from the counter 32 to generate the outputs of the paper size data and the original image scanning data in a manner similar to that in case of the copy operation of 15 times magnification, the address scanning of the memory 33 being caused by the output frequency of the counter 30 varied in inverse proportion to the variation in the frequency of the driving power for the motor 4 due to the change in the magnification ratio. Thus, the timing of the original image scanning is precisely adjusted.

In the case that this copy operation of 10 times magnification is made by using A3-size of paper, the switch of the printer for selecting the A3-size of paper is operated to its ON-position to supply a signal for the A3-size of paper to the logical circuit 34 which, in turn, compares this signal with the data derived from the memory 33 as in the case of the mentioned operation of 15 times magnification, thereby operating the output circuit 35 at an appropriate time to make the original image scanning operation.

When it is desired to further increase the magnification ratio by one percent in the above-mentioned copy operation of 15 times magnification, the magnification data remains at BCD 950, but the fine adjustment data is varied to BCD 60, so that the data input to the counter 22 is changed to BCD 1010 to vary the frequency of the power for driving the synchronous motor 4 to 49.5 Hz and also the output of the counter 30 to 121.21 pps. The operation in other respects is made as described hereinbefore to produce a copy image having the intended magnification.

In contrast when it is desired to reduce the magnification ratio by one percent in the normal copy operation of 15 times magnification, the fine adjustment data is varied to BCD 40 to change the data input to the counter circuit 22 to BCD 990, so that the frequency of the power for driving the motor 4 is adjusted to 50.55 Hz and the output of the counter 30 is varied to 118.8 pps.

As described above, the initiation, termination and speed of the original image scanning can easily be controlled by appropriately selecting the magnification and/or fine adjustment data by means of, for example, BCD switches.

It is common that the printers and copy machines are used by connecting them to the commercial power source and thus the rotational speed of the synchronous motor 4 for driving the respective photosensitive drum 1 is varied as the frequency of the source varies, thereby varying the magnification ratio of the copy image formed on the photosensitive material 2. In such an event, the frequency of the power source is multiplied by using an automatic phase control loop circuit (PLL circuit) instead of the crystal oscillator 21 to supply its output to the counter 22 and the frequency dividers 27 and 31, thereby providing the original image scanning speeds precisely corresponding to variations in the frequency of the power source or variations in the rotational speed of the drum 1.

Furthermore, any suitable direct current type two-phase synchronous motor other than the ordinary synchronous motor can be used as the motor 4 for making the original image scanning.

In those cases where it is not necessary to make the fine adjustment of the copy magnification ratio, there will be no need to provide the fine adjustment data, and the magnification data necessary to suitably operate the counter 22 is only to be supplied as magnification data to the counter 22. The frequency divider 24 is provided to convert the output pulses of the counter 22 to the frequency suitable to drive the motor 4, and may be omitted as the case may be. When the ratio of changing the magnification is large, the voltage applied across the synchronous motor 4 is to be varied dependent upon the driving frequency, but the frequency divider can vary the pulse widths on the positive and negative sides of the output wave form to adjust the effective voltage.

In the example described above, it is necessary that when the magnification ratio is changed the lens of the optical system is changed to vary the focal length or the total optical path length is changed to vary the ratio for magnifying the entire image.

In an alternative example of the system of the present invention, a zoom lens 18 for the projecting lens 15 of the optical system is used to continuously vary the focal length, thereby continuously varying the magnification ratio of the entire copy image. The lens-barrel of this zoom lens is connected to a suitable cam mechanism (not shown) to convert changes in the zoom ratio to changes in linearly functional motion of a driven part of the cam mechanism, said driven part being mechanically connected through an insulator to a movable contact of a variable resistor to cause a linearly functional variation in the resistance of this resistor, and this analog signal being supplied to a suitable analog-digital converter 19 to supply the digital output of this converter to the adder 23 of FIG. 2 as the magnification data.

Figure 3:
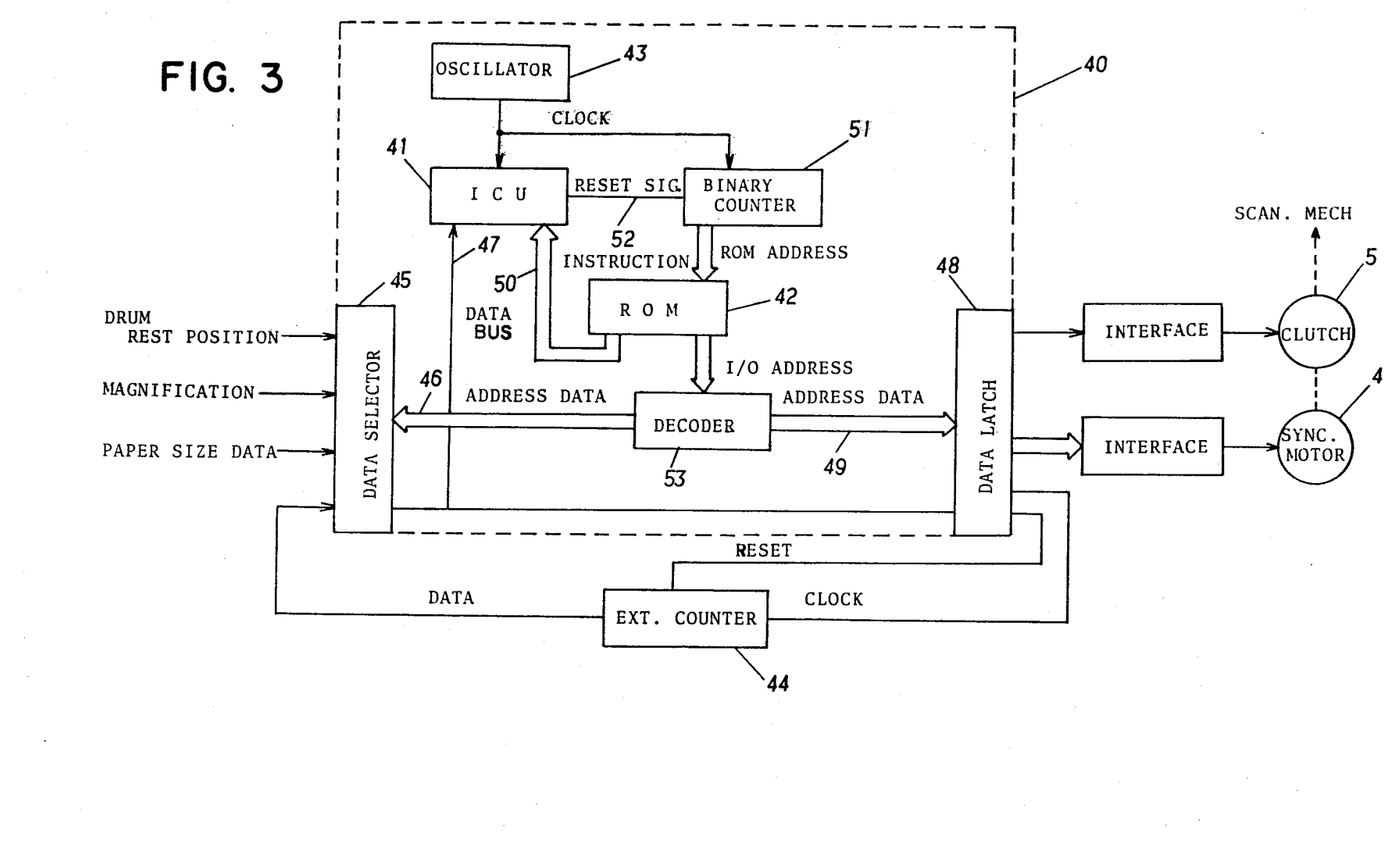
FIG. 3 is a block diagram of a practical example of the system of the invention for use with the printer shown in FIG. 1.

FIG. 3 shows a practical example of the system of the invention which is incorporated in the printer shown in FIG. 1 for providing two different blow back magnifications, i.e. 10-time and 15-time magnifications. This example is advantageous in that the magnification of the printer can be changed by selecting only the lens and the software. The system comprises a programable logical control circuit generally designated by a reference numeral 40 and encircled by broken lines in FIG. 3. The control circuit 40 includes a single bit central processing unit 41 which may be one sold under the trade name of "MC14500B Industrial Control Unit" by Motorola Semiconductor Products Inc., Austin, Tex., U.S.A. The operation of the unit is theoretically identical with a program containing type of processor and has 16 kinds of instruction words, and a series of instructions is written in a read only memory (ROM) 42. The system reads out the instructions and addresses of input and output subject to that instruction from the memory 42 to execute the instructions. After the execution of the instructions, a subsequent instruction is read out from the memory to repeat the procedure described above. The execution time of CLOCK of the system 40 is stabilized by using a 100 KHz crystal oscillator 43 and connected to an external binary counter 44 to control the original image scanning.

In FIG. 3, a reference numeral 45 designates a suitable data selector which is arranged so that only an input selected by an address data 46 is supplied through a data bus 47. A data latch 48 is arranged such that the output signal of the unit 41 is latched by an output selected by address data 49 and the status of the output can be referred to by the unit 41. Such communication of the data is all achieved by way of the data bus 47.

The unit 41 includes a CLOCK generator which is connected to the oscillator 43 for operating it by CLOCK having the natural frequency of the crystal.

A reference numeral 50 designates a data input for instruction arranged by four bits for the 16 kinds of the instructions derived from the memory 42. The memory 42 has eight bits per one address to utilize 1024 addresses. In the system of this example, the address data of the inputs and outputs are written on even number addresses and the instruction data on odd number addresses, and thus the system can be utilized to a program having up to 512 steps. Further, the instruction data uses six bits, four of which are for the unit 41 and the other two are for an external additional logical circuit not described in detail because it does not directly relate to the present invention.

A reference numeral 51 is a binary counter for counting CLOCK to give address to the memory 42, the counter being reset by a pulse signal 52 generated when the unit 41 has executed RETURN instruction. A decoder 53 serves to decode the input and output address data derived from the memory 42 to address the input data selector and the output latch.

Figure 4:
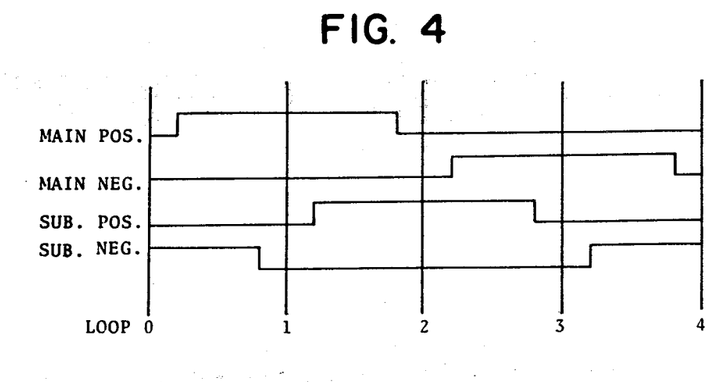
FIG. 4 is a time chart of the system of FIG. 3.

The motor 4 in this example is of a four-pole, two-phase synchronous type. MAIN POS signal and MAIN NEG signal shown in FIG. 4 are for a main winding of the motor 4, and SUB POS signal and SUB NEG signal are for a sub-winding thereof, the phase of which is at an angle of 90° relative to that of the main winding.

The time required to make one cycle operation of the program of the control circuit 40 is determined by the frequency of the CLOCK and the program. In this example, since the oscillating frequency of the crystal oscillator 43 is 100 KHz, the time required to make one step operation of the program is 10 microseconds, and if the counter 51 is reset at the 500th step of the program the time required to make one loop operation will be 5 milliseconds. Thus, the signal shown in FIG. 4 is a two-phase signal having a frequency of 50 Hz.

The original image scanning mechanism of this example is designed to provide 15-time magnification when the motor 4 is driven by a power, having the frequency of 50 Hz.

The MAGNIFICATION signal supplied to the data selector 45 is controlled by the operator to change the step length of the program loop corresponding to the magnification in such a manner that in the case of the 15-time magnification the loop length is 500 steps to provide a power of 50 Hz frequency to be supplied to the motor 4 and in the case of the 10-time magnification it is 333 steps to provide a power of 75 Hz frequency for the same purpose.

The timing of the original image scanning is controlled by the external counter 44 which is supplied with CLOCK to make increment every one loop of the program, the counter being reset at the rest position of the photosensitive drum.

The count number of the counter 44 is related by the system 40 to the timing of the original image scanning predetermined and written in the memory 42 corresponding to the paper size indicated by the paper size signal selected by the operator, and thus the clutch 5 is controlled.

Table 1 shows the program of this example.

TABLE 1

| I/O ADDRESS MAP | | | |
|---|---|---|---|
| INPUT | | OUTPUT | |
| 00 | RESULT REGISTER | 28 | CYC.C 1 |
| 01 | LOGIC 1 | 29 | CYC.C 2 |
| 02 | COUNTER 1 | 2A | 1ST REV |
| 03 | COUNTER 2 | 2B | 2ND REV |
| 04 | COUNTER 3 | 2C | 3RD REV |
| 05 | COUNTER 4 | 2D | 4TH REV |
| 06 | COUNTER 5 | 2E | 18 × 24 T.P |
| 07 | COUNTER 6 | 2F | C T.P |
| 08 | COUNTER 7 | 30 | B T.P |
| 09 | COUNTER 8 | 31 | LAZY A T.P |
| 0A | COUNTER 9 | 32 | A T.P |
| 0B | COUNTER 10 | 33 | MAIN POS |
| 0C | COUNTER 11 | 34 | MAIN NEG |
| 0D | MAG,10.2X | 35 | SUB POS |
| 0E | SCAN REF | 36 | SUB NEG |
| 0E | DRUM DRIVE | 37 | TEMP 1 |
| 10 | 100V AC | 38 | TEMP 2 |
| 11 | — | 39 | SCAN REF EDGE |
| 12 | — | 3A | —CLOCK |
| 13 | — | 3B | RESET |
| 14 | — | 3C | — |
| 15 | — | 3D | — |
| 16 | — | 3E | — |
| 17 | — | 3F | — |
| 18 | — | 40 | — |
| 19 | — | 41 | — |
| 1A | — | 42 | — |
| 1B | — | 43 | — |

TABLE 1-continued

| | | | | | | |
|---|---|---|---|---|---|---|
| | 1C | — | | 44 | — | |
| | 1D | — | | 45 | — | |
| | 1E | — | | 46 | — | |
| | 1F | — | | 47 | — | |
| | 20 | — | | 48 | — | |
| | 21 | — | | 49 | — | |
| | 22 | — | | 4A | — | |
| | 23 | — | | 4B | — | |
| | 24 | — | | 4C | — | |
| | 25 | — | | 4D | — | |
| | 26 | — | | 4E | — | |
| | 27 | — | | 4F | — | |

| ADRS | D0 | D1 | COMMENT | MNIC | E | I/O |
|---|---|---|---|---|---|---|
| 9600 | 01 | 0A | INITIALIZE | IEN | | LOGIC 1 |
| 9602 | 01 | 0B | | OEN | | LOGIC 1 |
| 9604 | 0F | 02 | SCAN DRIVE OFF | LDC | | DRUM DRIVE |
| 9606 | 10 | 16 | | ORC | S | 100V AC |
| 9608 | 00 | 00 | | NOP | | RESULT REGISTER |
| 960A | 33 | 29 | | STOC | A | MAIN POS |
| 960C | 34 | 29 | | STOC | A | MAIN NEG |
| 960E | 35 | 29 | | STOC | A | SUB POS |
| 9610 | 36 | 29 | | STOC | A | SUB NEG |
| 9612 | 00 | 0E | | SKZ | | RESULT REGISTER |
| 9614 | FF | 0F | | RTN | | — |
| 9616 | 28 | 02 | PROGRAM COUNTER | LDC | | CYC.C 1 |
| 9618 | 28 | 08 | | STO | | CYC.C 1 |
| 961A | 38 | 05 | | OR | | TEMP 2 |
| 961C | 38 | 08 | | STO | | TEMP 2 |
| 961E | 28 | 14 | | ANDC | S | CYC.C 1 |
| 9620 | 00 | 00 | | NOP | | RESULT REGISTER |
| 9622 | 38 | 29 | | STOC | A | TEMP 2 |
| 9624 | 29 | 02 | | LDC | | CYC.C 2 |
| 9626 | 29 | 28 | | STO | A | CYC.C 2 |
| 9628 | 28 | 01 | | LD | | CYC.C 1 |
| 962A | 29 | 04 | | ANDC | | CYC.C 2 |
| 962C | 2A | 08 | | STO | | 1ST REV |
| 962E | 28 | 02 | | LDC | | CYC.C 1 |
| 9630 | 29 | 03 | | AND | | CYC.C 2 |
| 9632 | 2B | 08 | | STO | | 2ND REV |
| 9634 | 28 | 01 | | LD | | CYC.C 1 |
| 9636 | 29 | 03 | | AND | | CYC.C 2 |
| 9638 | 2C | 08 | | STO | | 3RD REV |
| 963A | 28 | 02 | | LDC | | CYC.C 1 |
| 963C | 29 | 04 | | ANDC | | CYC.C 2 |
| 963E | 2D | 08 | | STO | | 4TH REV |
| 9640 | 00 | 00 | | NOP | | RESULT REGISTER |
| 9642 | 00 | 00 | | NOP | | RESULT REGISTER |
| 9644 | 00 | 00 | | NOP | | RESULT REGISTER |
| 9646 | 00 | 00 | | NOP | | RESULT REGISTER |
| 9648 | 00 | 00 | | NOP | | RESULT REGISTER |
| 964A | 00 | 00 | | NOP | | RESULT REGISTER |
| 964C | 00 | 00 | | NOP | | RESULT REGISTER |
| 964E | 00 | 00 | | NOP | | RESULT REGISTER |
| 9650 | 00 | 00 | | NOP | | RESULT REGISTER |
| 9652 | 00 | 00 | | NOP | | RESULT REGISTER |
| 9654 | 00 | 00 | | NOP | | RESULT REGISTER |
| 9656 | 00 | 00 | | NOP | | RESULT REGISTER |
| 9658 | 0D | 11 | 10.2X C UP | LD | S | MAG, 0.2X |
| 965A | 02 | 01 | | LD | | COUNTER 1 |
| 965C | 03 | 04 | | ANDC | | COUNTER 2 |
| 965E | 04 | 03 | | AND | | COUNTER 3 |
| 9660 | 05 | 03 | | AND | | COUNTER 4 |
| 9662 | 06 | 04 | | ANDC | | COUNTER 5 |
| 9664 | 07 | 04 | | ANDC | | COUNTER 6 |
| 9666 | 08 | 04 | | ANDC | | COUNTER 7 |
| 9668 | 09 | 03 | | AND | | COUNTER 8 |
| 966A | 0A | 04 | | ANDC | | COUNTER 9 |
| 966C | 0B | 04 | | ANDC | | COUNTER 10 |
| 966E | 0C | 04 | | ANDC | | COUNTER 11 |
| 9670 | 2F | 05 | | OR | | C T.P |
| 9672 | 2F | 28 | | STO | A | C T.P |
| 9674 | 00 | 00 | | NOP | | RESULT REGISTER |
| 9676 | 00 | 00 | | NOP | | RESULT REGISTER |
| 9678 | 0D | 11 | 10.2X SCAN SIG1 | LD | S | MAG,10.2X |
| 967A | 2A | 01 | | LD | | 1ST REV |
| 967C | 33 | 05 | | OR | | MAIN POS |
| 967E | 33 | 28 | | STO | A | MAIN POS |
| 9680 | 2B | 01 | | LD | | 2ND REV |
| 9682 | 35 | 05 | | OR | | SUB POS |
| 9684 | 35 | 28 | | STO | A | SUB POS |
| 9686 | 2C | 01 | | LD | | 3RD REV |

TABLE 1-continued

| | | | | | | |
|---|---|---|---|---|---|---|
| 9688 | 34 | 05 | | OR | | MAIN NEG |
| 968A | 34 | 28 | | STO | A | MAIN NEG |
| 968C | 2D | 01 | | LD | | 4TH REV |
| 968E | 36 | 05 | | OR | | SUB NEG |
| 9690 | 36 | 28 | | STO | A | SUB NEG |
| 9692 | 0D | 11 | 10.2X C DOWN | LD | S | MAG,10.2X |
| 9694 | 02 | 02 | | LDC | | COUNTER 1 |
| 9696 | 03 | 03 | | AND | | COUNTER 2 |
| 9698 | 04 | 04 | | ANDC | | COUNTER 3 |
| 969A | 05 | 04 | | ANDC | | COUNTER 4 |
| 969C | 06 | 03 | | AND | | COUNTER 5 |
| 969E | 07 | 04 | | ANDC | | COUNTER 6 |
| 96A0 | 08 | 04 | | ANDC | | COUNTER 7 |
| 96A2 | 09 | 03 | | AND | | COUNTER 8 |
| 96A4 | 0A | 03 | | AND | | COUNTER 9 |
| 96A6 | 0B | 04 | | ANDC | | COUNTER 10 |
| 96A8 | 0C | 03 | | AND | | COUNTER 11 |
| 96AA | 2F | 06 | | ORC | | C T.P |
| 96AC | 2F | 29 | | STOC | A | C T.P |
| 96AE | 00 | 00 | | NOP | | RESULT REGISTER |
| 96B0 | 00 | 00 | | NOP | | RESULT REGISTER |
| 96B2 | 00 | 00 | | NOP | | RESULT REGISTER |
| 96B4 | 00 | 00 | | NOP | | RESULT REGISTER |
| 96B6 | 0D | 12 | 15X SCAN SIGN | LDC | S | MAG,10.2X |
| 96B8 | 2A | 01 | | LD | | 1ST REV |
| 96BA | 33 | 05 | | OR | | MAIN POS |
| 96BC | 33 | 28 | | STO | A | MAIN POS |
| 96BE | 2B | 01 | | LD | | 2ND REV |
| 96C0 | 35 | 05 | | OR | | SUB POS |
| 96C2 | 35 | 28 | | STO | A | SUB POS |
| 96C4 | 2C | 01 | | LD | | 3RD REV |
| 96C6 | 34 | 05 | | OR | | MAIN NEG |
| 96C8 | 34 | 28 | | STO | A | MAIN NEG |
| 96CA | 2D | 01 | | LD | | 4TH REV |
| 96CC | 36 | 05 | | OR | | SUB NEG |
| 96CE | 36 | 28 | | STO | A | SUB NEG |
| 96D0 | 00 | 00 | | NOP | | RESULT REGISTER |
| 96D2 | 00 | 00 | | NOP | | RESULT REGISTER |
| 96D4 | 00 | 00 | | NOP | | RESULT REGISTER |
| 96D6 | 00 | 00 | | NOP | | RESULT REGISTER |
| 96D8 | 00 | 00 | | NOP | | RESULT REGISTER |
| 96DA | 0D | 11 | 10.2X B UP | LD | S | MAG, 10.2X |
| 96DC | 02 | 02 | | LDC | | COUNTER 1 |
| 96DE | 03 | 04 | | ANDC | | COUNTER 2 |
| 96E0 | 04 | 03 | | AND | | COUNTER 3 |
| 96E2 | 05 | 04 | | ANDC | | COUNTER 4 |
| 96E4 | 06 | 03 | | AND | | COUNTER 5 |
| 96E6 | 07 | 04 | | ANDC | | COUNTER 6 |
| 96E8 | 08 | 04 | | ANDC | | COUNTER 7 |
| 96EA | 09 | 04 | | ANDC | | COUNTER 8 |
| 96EC | 0A | 03 | | AND | | COUNTER 9 |
| 96EE | 0B | 03 | | AND | | COUNTER 10 |
| 96F0 | 0C | 03 | | AND | | COUNTER 11 |
| 96F2 | 30 | 05 | | OR | | B T.P |
| 96F4 | 30 | 28 | | STO | A | B T.P |
| 96F6 | 02 | 02 | 10.2X B DOWN | LDC | | COUNTER 1 |
| 96F8 | 03 | 04 | | ANDC | | COUNTER 2 |
| 96FA | 04 | 04 | | ANDC | | COUNTER 3 |
| 96FC | 05 | 04 | | ANDC | | COUNTER 4 |
| 96FE | 06 | 03 | | AND | | COUNTER 5 |
| 9700 | 07 | 03 | | AND | | COUNTER 6 |
| 9702 | 08 | 03 | | AND | | COUNTER 7 |
| 9704 | 09 | 03 | | AND | | COUNTER 8 |
| 9706 | 0A | 03 | | AND | | COUNTER 9 |
| 9708 | 0B | 03 | | AND | | COUNTER 10 |
| 970A | 0C | 04 | | ANDC | | COUNTER 11 |
| 970C | 30 | 06 | | ORC | | B T.P |
| 970E | 30 | 29 | | STOC | A | B T.P |
| 9710 | 02 | 02 | 10.2X L-A UP | LDC | | COUNTER 1 |
| 9712 | 03 | 03 | | AND | | COUNTER 2 |
| 9714 | 04 | 04 | | ANDC | | COUNTER 3 |
| 9716 | 05 | 04 | | ANDC | | COUNTER 4 |
| 9718 | 06 | 04 | | ANDC | | COUNTER 5 |
| 971A | 07 | 04 | | ANDC | | COUNTER 6 |
| 971C | 08 | 04 | | ANDC | | COUNTER 7 |
| 971E | 09 | 03 | | AND | | COUNTER 8 |
| 9720 | 0A | 04 | | ANDC | | COUNTER 9 |
| 9722 | 0B | 03 | | AND | | COUNTER 10 |
| 9724 | 0C | 03 | | AND | | COUNTER 11 |
| 9726 | 31 | 05 | | OR | | LAZY A T.P |
| 9728 | 31 | 28 | | STO | A | LAZY A T.P |
| 972A | 02 | 01 | 10.2X L-A DOWN | LD | | COUNTER 1 |

TABLE 1-continued

| | | | | | |
|---|---|---|---|---|---|
| 972C | 03 | 03 | | AND | COUNTER 2 |
| 972E | 04 | 04 | | ANDC | COUNTER 3 |
| 9730 | 05 | 03 | | AND | COUNTER 4 |
| 9732 | 06 | 04 | | ANDC | COUNTER 5 |
| 9734 | 07 | 04 | | ANDC | COUNTER 6 |
| 9736 | 08 | 03 | | AND | COUNTER 7 |
| 9738 | 09 | 03 | | AND | COUNTER 8 |
| 973A | 0A | 04 | | ANDC | COUNTER 9 |
| 973C | 0B | 03 | | AND | COUNTER 10 |
| 973E | 0C | 04 | | ANDC | COUNTER 11 |
| 9740 | 31 | 06 | | ORC | LAZY A T.P |
| 9742 | 31 | 29 | | STOC A | LAZY A T.P |
| 9744 | 02 | 02 | 10.2X A UP | LDC | COUNTER 1 |
| 9746 | 03 | 03 | | AND | COUNTER 2 |
| 9748 | 04 | 04 | | ANDC | COUNTER 3 |
| 974A | 05 | 03 | | AND | COUNTER 4 |
| 974C | 06 | 03 | | AND | COUNTER 5 |
| 974E | 07 | 04 | | ANDC | COUNTER 6 |
| 9750 | 08 | 04 | | ANDC | COUNTER 7 |
| 9752 | 09 | 04 | | ANDC | COUNTER 8 |
| 9754 | 0A | 04 | | ANDC | COUNTER 9 |
| 9756 | 0B | 03 | | AND | COUNTER 10 |
| 9758 | 0C | 03 | | AND | COUNTER 11 |
| 975A | 32 | 05 | | OR | A T.P |
| 975C | 32 | 28 | | STO A | A T.P |
| 975E | 02 | 02 | 10.2x A DOWN | LDC | COUNTER 1 |
| 9760 | 03 | 03 | | AND | COUNTER 2 |
| 9762 | 04 | 04 | | ANDC | COUNTER 3 |
| 9764 | 05 | 03 | | AND | COUNTER 4 |
| 9766 | 06 | 03 | | AND | COUNTER 5 |
| 9768 | 07 | 03 | | AND | COUNTER 6 |
| 976A | 08 | 03 | | AND | COUNTER 7 |
| 976C | 09 | 03 | | AND | COUNTER 8 |
| 976E | 0A | 03 | | AND | COUNTER 9 |
| 9770 | 0B | 04 | | ANDC | COUNTER 10 |
| 9772 | 0C | 04 | | ANDC | COUNTER 11 |
| 9774 | 32 | 06 | | ORC | A T.P |
| 9776 | 32 | 29 | | STOC A | A T.P |
| 9778 | 0E | 02 | SCAN REF EDGE | LDC | SCAN REF |
| 977A | 37 | 05 | | OR | TEMP 1 |
| 977C | 37 | 08 | | STO | TEMP 1 |
| 977E | 0E | 01 | | LD | SCAN REF |
| 9780 | 37 | 13 | | AND S | TEMP 1 |
| 9782 | 00 | 00 | | NOP | RESULT REGISTER |
| 9784 | 39 | 28 | | STO A | SCAN REF EDGE |
| 9786 | 37 | 29 | | STOC A | TEMP 1 |
| 9788 | 0F | 02 | RESET | LDC | DRUM DRIVE |
| 978A | 3B | 05 | | OR | RESET |
| 978C | 3B | 08 | | STO | RESET |
| 978E | 0F | 01 | | LD | DRUM DRIVE |
| 9790 | 39 | 13 | | AND S | SCAN REF EDGE |
| 9792 | 3B | 24 | | STO | RESET |
| 9794 | 39 | 29 | | STOC A | SCAN REF EDGE |
| 9796 | 01 | 01 | —CLOCK | LD | LOGIC 1 |
| 9798 | 3A | 08 | | STO | —CLOCK |
| 979A | 00 | 00 | | NOP | RESULT REGISTER |
| 979C | 00 | 00 | | NOP | RESULT REGISTER |
| 979E | 00 | 00 | | NOP | RESULT REGISTER |
| 97A0 | 00 | 00 | | NOP | RESULT REGISTER |
| 97A2 | 00 | 00 | | NOP | RESULT REGISTER |
| 97A4 | 3A | 09 | | STOC | —CLOCK |
| 97A6 | 0D | 11 | 10.2X 18 × 24 UP | LD S | MAG, 10.2X |
| 97A8 | 02 | 01 | | LD | COUNTER 1 |
| 97AA | 03 | 03 | | AND | COUNTER 2 |
| 97AC | 04 | 03 | | AND | COUNTER 3 |
| 97AE | 05 | 03 | | AND | COUNTER 4 |
| 97B0 | 06 | 03 | | AND | COUNTER 5 |
| 97B2 | 07 | 04 | | ANDC | COUNTER 6 |
| 97B4 | 08 | 04 | | ANDC | COUNTER 7 |
| 97B6 | 09 | 03 | | AND | COUNTER 8 |
| 97B8 | 0A | 04 | | ANDC | COUNTER 9 |
| 97BA | 0B | 04 | | ANDC | COUNTER 10 |
| 97BC | 0C | 04 | | ANDC | COUNTER 11 |
| 97BE | 2E | 05 | | OR | 18 × 24 T.P |
| 97C0 | 2E | 28 | | STO A | 18 × 27 T.P |
| 97C2 | 02 | 02 | 10.2X 18 × 24 DOWN | LDC | COUNTER 1 |
| 97C4 | 03 | 03 | | AND | COUNTER 2 |
| 97C6 | 04 | 03 | | AND | COUNTER 3 |
| 97C8 | 05 | 04 | | ANDC | COUNTER 4 |
| 97CA | 06 | 03 | | AND | COUNTER 5 |
| 97CC | 07 | 03 | | AND | COUNTER 6 |
| 97CE | 08 | 04 | | ANDC | COUNTER 7 |

TABLE 1-continued

| | | | | | | |
|---|---|---|---|---|---|---|
| 97D0 | 09 | 03 | | AND | | COUNTER 8 |
| 97D2 | 0A | 03 | | AND | | COUNTER 9 |
| 97D4 | 0B | 04 | | ANDC | | COUNTER 10 |
| 97D6 | 0C | 03 | | AND | | COUNTER 11 |
| 97D8 | 2E | 06 | | ORC | | 18 × 24 T.P |
| 97DA | 2E | 29 | | STOC | A | 18 × 24 T.P |
| 97DC | 0D | 12 | 15X C UP | LDC | S | MAG, 10.2X |
| 97DE | 02 | 01 | | LD | | COUNTER 1 |
| 97E0 | 03 | 04 | | ANDC | | COUNTER 2 |
| 97E2 | 04 | 03 | | AND | | COUNTER 3 |
| 97E4 | 05 | 03 | | AND | | COUNTER 4 |
| 97E6 | 06 | 04 | | ANDC | | COUNTER 5 |
| 97E8 | 07 | 03 | | AND | | COUNTER 6 |
| 97EA | 08 | 04 | | ANDC | | COUNTER 7 |
| 97EC | 09 | 03 | | AND | | COUNTER 8 |
| 97EE | 0A | 04 | | ANDC | | COUNTER 9 |
| 97F0 | 0B | 04 | | ANDC | | COUNTER 10 |
| 97F2 | 0C | 03 | | AND | | COUNTER 11 |
| 97F4 | 2F | 05 | | OR | | C T.P |
| 97F6 | 2F | 28 | | STO | A | C T.P |
| 97F8 | 0D | 11 | 10.2X SCAN SIG2 | LD | S | MAG, 10.2X |
| 97FA | 2A | 01 | | LD | | 1ST REV |
| 97FC | 36 | 06 | | ORC | | SUB NEG |
| 97FE | 36 | 29 | | STOC | A | SUB NEG |
| 9800 | 2B | 01 | | LD | | 2ND REV |
| 9802 | 33 | 06 | | ORC | | MAIN POS |
| 9804 | 33 | 29 | | STOC | A | MAIN POS |
| 9806 | 2C | 01 | | LD | | 3RD REV |
| 9808 | 35 | 06 | | ORC | | SUB POS |
| 980A | 35 | 29 | | STOC | A | SUB POS |
| 980C | 2D | 01 | | LD | | 4TH REV |
| 980E | 34 | 06 | | ORC | | MAIN NEG |
| 9810 | 34 | 29 | | STOC | A | MAIN NEG |
| 9812 | 00 | 00 | | NOP | | RESULT REGISTER |
| 9814 | 00 | 00 | | NOP | | RESULT REGISTER |
| 9816 | 00 | 00 | | NOP | | RESULT REGISTER |
| 9818 | 00 | 00 | | NOP | | RESULT REGISTER |
| 981A | 00 | 00 | | NOP | | RESULT REGISTER |
| 981C | 00 | 00 | | NOP | | RESULT REGISTER |
| 981E | 0D | 12 | 15X C DOWN | LDC | S | MAG, 10.2X |
| 9820 | 02 | 02 | | LDC | | COUNTER 1 |
| 9822 | 03 | 04 | | ANDC | | COUNTER 2 |
| 9824 | 04 | 04 | | ANDC | | COUNTER 3 |
| 9826 | 05 | 03 | | AND | | COUNTER 4 |
| 9828 | 06 | 04 | | ANDC | | COUNTER 5 |
| 982A | 07 | 04 | | ANDC | | COUNTER 6 |
| 982C | 08 | 03 | | AND | | COUNTER 7 |
| 982E | 09 | 03 | | AND | | COUNTER 8 |
| 9830 | 0A | 03 | | AND | | COUNTER 9 |
| 9832 | 0B | 03 | | AND | | COUNTER 10 |
| 9834 | 0C | 04 | | ANDC | | COUNTER 11 |
| 9836 | 2F | 06 | | ORC | | C T.P |
| 9838 | 2F | 29 | | STOC | A | C T.P |
| 983A | 0D | 12 | 15X B UP | LDC | S | MAG, 10.2X |
| 983C | 02 | 01 | | LD | | COUNTER 1 |
| 983E | 03 | 03 | | AND | | COUNTER 2 |
| 9840 | 04 | 03 | | AND | | COUNTER 3 |
| 9842 | 05 | 03 | | AND | | COUNTER 4 |
| 9844 | 06 | 03 | | AND | | COUNTER 5 |
| 9846 | 07 | 04 | | ANDC | | COUNTER 6 |
| 9848 | 08 | 04 | | ANDC | | COUNTER 7 |
| 984A | 09 | 04 | | ANDC | | COUNTER 8 |
| 984C | 0A | 04 | | ANDC | | COUNTER 9 |
| 984E | 0B | 04 | | ANDC | | COUNTER 10 |
| 9850 | 0C | 03 | | AND | | COUNTER 11 |
| 9852 | 30 | 05 | | OR | | B T.P |
| 9854 | 30 | 28 | | STO | A | B T.P |
| 9856 | 02 | 01 | 15X B DOWN | LD | | COUNTER 1 |
| 9858 | 03 | 04 | | ANDC | | COUNTER 2 |
| 985A | 04 | 03 | | AND | | COUNTER 3 |
| 985C | 05 | 03 | | AND | | COUNTER 4 |
| 985E | 06 | 04 | | ANDC | | COUNTER 5 |
| 9860 | 07 | 03 | | AND | | COUNTER 6 |
| 9862 | 08 | 04 | | ANDC | | COUNTER 7 |
| 9864 | 09 | 03 | | AND | | COUNTER 8 |
| 9866 | 0A | 04 | | ANDC | | COUNTER 9 |
| 9868 | 0B | 03 | | AND | | COUNTER 10 |
| 986A | 0C | 04 | | ANDC | | COUNTER 11 |
| 986C | 30 | 06 | | ORC | | B T.P |
| 986E | 30 | 29 | | STOC | A | B T.P |
| 9870 | 00 | 00 | | NOP | | RESULT REGISTER |
| 9872 | 00 | 00 | | NOP | | RESULT REGISTER |

TABLE 1-continued

| | | | | | |
|---|---|---|---|---|---|
| 9874 | 00 | 00 | | NOP | RESULT REGISTER |
| 9876 | 00 | 00 | | NOP | RESULT REGISTER |
| 9878 | 00 | 00 | | NOP | RESULT REGISTER |
| 987A | 0D | 01 | 10.2X END | LD | MAG, 10.2X |
| 987C | 00 | 0E | | SKZ | RESULT REGISTER |
| 987E | FF | 0F | | RTN | — |
| 9880 | 02 | 01 | 15X L-A UP | LD | COUNTER 1 |
| 9882 | 03 | 03 | | AND | COUNTER 2 |
| 9884 | 04 | 04 | | ANDC | COUNTER 3 |
| 9886 | 05 | 03 | | AND | COUNTER 4 |
| 9888 | 06 | 03 | | AND | COUNTER 5 |
| 988A | 07 | 03 | | AND | COUNTER 6 |
| 988C | 08 | 04 | | ANDC | COUNTER 7 |
| 988E | 09 | 03 | | AND | COUNTER 8 |
| 9890 | 0A | 03 | | AND | COUNTER 9 |
| 9892 | 0B | 03 | | AND | COUNTER 10 |
| 9894 | 0C | 04 | | ANDC | COUNTER 11 |
| 9896 | 31 | 05 | | OR | LAZY A T.P |
| 9898 | 31 | 28 | | STO A | LAZY A T.P |
| 989A | 02 | 01 | 15X L-A DOWN | LD | COUNTER 1 |
| 989C | 03 | 04 | | ANDC | COUNTER 2 |
| 989E | 04 | 03 | | AND | COUNTER 3 |
| 98A0 | 05 | 04 | | ANDC | COUNTER 4 |
| 98A2 | 06 | 04 | | ANDC | COUNTER 5 |
| 98A4 | 07 | 03 | | AND | COUNTER 6 |
| 98A6 | 08 | 03 | | AND | COUNTER 7 |
| 98A8 | 09 | 03 | | AND | COUNTER 8 |
| 98AA | 0A | 03 | | AND | COUNTER 9 |
| 98AC | 0B | 04 | | ANDC | COUNTER 10 |
| 98AE | 0C | 04 | | ANDC | COUNTER 11 |
| 98B0 | 31 | 06 | | ORC | LAZY A T.P |
| 98B2 | 31 | 29 | | STOC A | LAZY A T.P |
| 98B4 | 02 | 02 | 15X A UP | LDC | COUNTER 1 |
| 98B6 | 03 | 04 | | ANDC | COUNTER 2 |
| 98B8 | 04 | 03 | | ANDC | COUNTER 3 |
| 98BA | 05 | 04 | | ANDC | COUNTER 4 |
| 98BC | 06 | 03 | | AND | COUNTER 5 |
| 98BE | 07 | 03 | | AND | COUNTER 6 |
| 98C0 | 08 | 03 | | AND | COUNTER 7 |
| 98C2 | 09 | 04 | | ANDC | COUNTER 8 |
| 98C4 | 0A | 03 | | AND | COUNTER 9 |
| 98C6 | 0B | 03 | | AND | COUNTER 10 |
| 98C8 | 0C | 04 | | ANDC | COUNTER 11 |
| 98CA | 32 | 05 | | OR | A T.P |
| 98CC | 32 | 28 | | STO A | A T.P |
| 98CE | 00 | 00 | | NOP | RESULT REGISTER |
| 98D0 | 00 | 00 | | NOP | RESULT REGISTER |
| 98D2 | 00 | 00 | | NOP | RESULT REGISTER |
| 98D4 | 00 | 00 | | NOP | RESULT REGISTER |
| 98D6 | 00 | 00 | | NOP | RESULT REGISTER |
| 98D8 | 00 | 00 | | NOP | RESULT REGISTER |
| 98DA | 00 | 00 | | NOP | RESULT REGISTER |
| 98DC | 00 | 00 | | NOP | RESULT REGISTER |
| 98DE | 00 | 00 | | NOP | RESULT REGISTER |
| 98E0 | 00 | 00 | | NOP | RESULT REGISTER |
| 98E2 | 00 | 00 | | NOP | RESULT REGISTER |
| 98E4 | 00 | 00 | | NOP | RESULT REGISTER |
| 98E6 | 00 | 00 | | NOP | RESULT REGISTER |
| 98E8 | 00 | 00 | | NOP | RESULT REGISTER |
| 98EA | 2A | 01 | 15X SCAN SIG2 | LD | 1ST REV |
| 98EC | 36 | 06 | | ORC | SUB NEG |
| 98EE | 36 | 29 | | STOC A | SUB NEG |
| 98F0 | 2B | 01 | | LD | 2ND REV |
| 98F2 | 33 | 06 | | ORC | MAIN POS |
| 98F4 | 33 | 29 | | STOC A | MAIN POS |
| 98F6 | 2C | 01 | | LD | 3RD REV |
| 98F8 | 35 | 06 | | ORC | SUB POS |
| 98FA | 35 | 29 | | STOC A | SUB POS |
| 98FC | 2D | 01 | | LD | 4TH REV |
| 98FF | 34 | 06 | | ORC | MAIN NEG |
| 9900 | 34 | 29 | | STOC A | MAIN NEG |
| 9902 | 00 | 00 | | NOP | RESULT REGISTER |
| 9904 | 02 | 02 | 15X A DOWN | LDC | COUNTER 1 |
| 9906 | 03 | 03 | | AND | COUNTER 2 |
| 9908 | 04 | 03 | | AND | COUNTER 3 |
| 990A | 05 | 04 | | ANDC | COUNTER 4 |
| 990C | 06 | 03 | | AND | COUNTER 5 |
| 990E | 07 | 04 | | ANDC | COUNTER 6 |
| 9910 | 08 | 03 | | AND | COUNTER 7 |
| 9912 | 09 | 04 | | ANDC | COUNTER 8 |
| 9914 | 0A | 03 | | AND | COUNTER 9 |
| 9916 | 0B | 04 | | ANDC | COUNTER 10 |

TABLE 1-continued

| | | | | | |
|---|---|---|---|---|---|
| 9918 | 0C | 04 | | ANDC | COUNTER 11 |
| 991A | 32 | 06 | | ORC | A T.P |
| 991C | 32 | 29 | | STOC A | A T.P |
| 991E | 00 | 00 | | NOP | RESULT REGISTER |
| 9920 | 00 | 00 | | NOP | RESULT REGISTER |
| 9922 | 00 | 00 | | NOP | RESULT REGISTER |
| 9924 | 00 | 00 | | NOP | RESULT REGISTER |
| 9926 | 00 | 00 | | NOP | RESULT REGISTER |
| 9928 | 00 | 00 | | NOP | RESULT REGISTER |
| 992A | 00 | 00 | | NOP | RESULT REGISTER |
| 992C | 00 | 00 | | NOP | RESULT REGISTER |
| 992E | 00 | 00 | | NOP | RESULT REGISTER |
| 9930 | 00 | 00 | | NOP | RESULT REGISTER |
| 9932 | 00 | 00 | | NOP | RESULT REGISTER |
| 9934 | 0D | 12 | 15X 18 × 24 UP | LDC S | MAG, 10.2X |
| 9936 | 02 | 02 | | LDC | COUNTER 1 |
| 9938 | 03 | 03 | | AND | COUNTER 2 |
| 993A | 04 | 04 | | ANDC | COUNTER 3 |
| 993C | 05 | 03 | | AND | COUNTER 4 |
| 993E | 06 | 03 | | AND | COUNTER 5 |
| 9940 | 07 | 03 | | AND | COUNTER 6 |
| 9942 | 08 | 04 | | ANDC | COUNTER 7 |
| 9944 | 09 | 03 | | AND | COUNTER 8 |
| 9946 | 0A | 04 | | ANDC | COUNTER 9 |
| 9948 | 0B | 04 | | ANDC | COUNTER 10 |
| 994A | 0C | 03 | | AND | COUNTER 11 |
| 994C | 2E | 05 | | OR | 18 × 24 T.P |
| 994E | 2E | 28 | | STO A | 18 × 24 T.P |
| 9950 | 02 | 01 | 15X 18 × 24 DOWN | LD | COUNTER 1 |
| 9952 | 03 | 03 | | AND | COUNTER 2 |
| 9954 | 04 | 04 | | ANDC | COUNTER 3 |
| 9956 | 05 | 04 | | ANDC | COUNTER 4 |
| 9958 | 06 | 04 | | ANDC | COUNTER 5 |
| 995A | 07 | 03 | | AND | COUNTER 6 |
| 995C | 08 | 03 | | AND | COUNTER 7 |
| 995E | 09 | 03 | | AND | COUNTER 8 |
| 9960 | 0A | 03 | | AND | COUNTER 9 |
| 9962 | 0B | 03 | | AND | COUNTER 10 |
| 9964 | 0C | 04 | | ANDC | COUNTER 11 |
| 9966 | 2E | 06 | | ORC | 18 × 24 T.P |
| 9968 | 2E | 29 | | STOC A | 18 × 24 T.P |
| 996A | 00 | 00 | | NOP | RESULT REGISTER |
| 996C | 00 | 00 | | NOP | RESULT REGISTER |
| 996E | 00 | 00 | | NOP | RESULT REGISTER |
| 9970 | 00 | 00 | | NOP | RESULT REGISTER |
| 9972 | 00 | 00 | | NOP | RESULT REGISTER |
| 9974 | 00 | 00 | | NOP | RESULT REGISTER |
| 9976 | 00 | 00 | | NOP | RESULT REGISTER |
| 9978 | 00 | 00 | | NOP | RESULT REGISTER |
| 997A | 00 | 00 | | NOP | RESULT REGISTER |
| 997C | 00 | 00 | | NOP | RESULT REGISTER |
| 997E | 00 | 00 | | NOP | RESULT REGISTER |
| 9980 | 00 | 00 | | NOP | RESULT REGISTER |
| 9982 | 00 | 00 | | NOP | RESULT REGISTER |
| 9984 | 00 | 00 | | NOP | RESULT REGISTER |
| 9986 | 00 | 00 | | NOP | RESULT REGISTER |
| 9988 | 00 | 00 | | NOP | RESULT REGISTER |
| 998A | FF | 0F | 154 END | RTN | — |
| 998C | 00 | 00 | | NOP | RESULT REGISTER |
| 998E | 00 | 00 | | NOP | RESULT REGISTER |
| 9990 | 00 | 00 | | NOP | RESULT REGISTER |
| 9992 | 00 | 00 | | NOP | RESULT REGISTER |
| 9994 | 00 | 00 | | NOP | RESULT REGISTER |
| 9996 | 00 | 00 | | NOP | RESULT REGISTER |
| 9998 | 00 | 00 | | NOP | RESULT REGISTER |
| 999A | 00 | 00 | | NOP | RESULT REGISTER |
| 999C | 00 | 00 | | NOP | RESULT REGISTER |
| 999E | 00 | 00 | | NOP | RESULT REGISTER |
| 99A0 | 00 | 00 | | NOP | RESULT REGISTER |
| 99A2 | 00 | 00 | | NOP | RESULT REGISTER |
| 99A4 | 00 | 00 | | NOP | RESULT REGISTER |
| 99A6 | 00 | 00 | | NOP | RESULT REGISTER |
| 99A8 | 00 | 00 | | NOP | RESULT REGISTER |
| 99AA | 00 | 00 | | NOP | RESULT REGISTER |
| 99AC | 00 | 00 | | NOP | RESULT REGISTER |
| 99AE | 00 | 00 | | NOP | RESULT REGISTER |
| 99B0 | 00 | 00 | | NOP | RESULT REGISTER |
| 99B2 | 00 | 00 | | NOP | RESULT REGISTER |
| 99B4 | 00 | 00 | | NOP | RESULT REGISTER |
| 99B6 | 00 | 00 | | NOP | RESULT REGISTER |
| 99B8 | 00 | 00 | | NOP | RESULT REGISTER |
| 99BA | 00 | 00 | | NOP | RESULT REGISTER |

TABLE 1-continued

| | | | | |
|---|---|---|---|---|
| 99BC | 00 | 00 | NOP | RESULT REGISTER |
| 99BE | 00 | 00 | NOP | RESULT REGISTER |
| 99C0 | 00 | 00 | NOP | RESULT REGISTER |
| 99C2 | 00 | 00 | NOP | RESULT REGISTER |
| 99C4 | 00 | 00 | NOP | RESULT REGISTER |
| 99C6 | 00 | 00 | NOP | RESULT REGISTER |
| 99C8 | 00 | 00 | NOP | RESULT REGISTER |
| 99CA | 00 | 00 | NOP | RESULT REGISTER |
| 99CC | 00 | 00 | NOP | RESULT REGISTER |
| 99CE | 00 | 00 | NOP | RESULT REGISTER |
| 99D0 | 00 | 00 | NOP | RESULT REGISTER |
| 99D2 | 00 | 00 | NOP | RESULT REGISTER |
| 99D4 | 00 | 00 | NOP | RESULT REGISTER |
| 99D6 | 00 | 00 | NOP | RESULT REGISTER |
| 99D8 | 00 | 00 | NOP | RESULT REGISTER |
| 99DA | 00 | 00 | NOP | RESULT REGISTER |
| 99DC | 00 | 00 | NOP | RESULT REGISTER |
| 99DE | 00 | 00 | NOP | RESULT REGISTER |
| 99E0 | 00 | 00 | NOP | RESULT REGISTER |
| 99E2 | 00 | 00 | NOP | RESULT REGISTER |
| 99E4 | 00 | 00 | NOP | RESULT REGISTER |
| 99E6 | 00 | 00 | NOP | RESULT REGISTER |
| 99E8 | 00 | 00 | NOP | RESULT REGISTER |
| 99EA | 00 | 00 | NOP | RESULT REGISTER |
| 99EC | 00 | 00 | NOP | RESULT REGISTER |
| 99EE | 00 | 00 | NOP | RESULT REGISTER |
| 99F0 | 00 | 00 | NOP | RESULT REGISTER |
| 99F2 | 00 | 00 | NOP | RESULT REGISTER |
| 99F4 | 00 | 00 | NOP | RESULT REGISTER |
| 99F6 | 00 | 00 | NOP | RESULT REGISTER |
| 99F8 | 00 | 00 | NOP | RESULT REGISTER |
| 99FA | 00 | 00 | NOP | RESULT REGISTER |
| 99FC | 00 | 00 | NOP | RESULT REGISTER |
| 99FE | 00 | 00 | NOP | RESULT REGISTER |

What is claimed is:

1. A system for controlling an original image scanning for use in a slit exposure type image recording apparatus adapted to project an original image through slit exposure over an image recording medium moving at a predetermined speed, which comprises an oscillating means for generating an output of a predetermined frequency, a first pulse counting means supplied with the output from said oscillating means and magnification data corresponding to a desired image magnification ratio and generating output pulses of a predetermined frequency, a power amplifying means receiving said output pulses from said first pulse counting means and generating a power output of a predetermined frequency corresponding thereto, and a synchronous motor for conducting the original image scanning while driven by the power output from said power amplifying means.

2. The system for controlling the original image scanning as defined in claim 1, wherein said oscillating means consists of a crystal oscillator or a phase locked loop circuit.

3. The system for controlling the original image scanning as defined by claim 1, wherein the original image is projected over said image recording medium by way of a zoom lens and an analog-digital conversion means is provided for supplying, interlocked with said zoom lens, a magnification data corresponding to the zooming ratio to said first pulse counting means.

4. The system for controlling the original image scanning as defined by claim 2, wherein the original image is projected over said image recording medium by way of a zoom lens and an analog-digital conversion means is provided for supplying, interlocked with said zoom lens, a magnification data corresponding to the zooming ratio to said first pulse counting means.

5. The system for controlling the original image scanning as defined by claim 1, wherein an adding means for adding said magnification data and a fine control data for the magnification is provided, whose output data is supplied to said first pulse counting means.

6. The system for controlling the original image scanning as defined by claim 2, wherein an adding means for adding said magnification data and a fine control data for the magnification is provided, whose output data is supplied to said first pulse counting means.

7. The system for controlling the original image scanning as defined by claim 3, wherein an adding means for adding said magnification data and a fine control data for the magnification is provided, whose output data is supplied to said first pulse counting means.

8. The system for controlling the original image scanning as defined by claim 4, wherein an adding means for adding said magnification data and a fine control data for the magnification is provided, whose output data is supplied to said first pulse counting means.

9. A system for controlling an original image scanning for use in a slit exposure-type image recording apparatus adapted to project an original image through slit exposure over an image recording medium moving at predetermined speed, comprising:
an oscillating means for generating pulses at a predetermined frequency;
a first pulse counting means responsive to the output of said oscillating means and to magnification data corresponding to a desired image magnification ratio for generating output pulses at a frequency which depends upon the magnification data;
a power amplifying means for receiving said output pulses from said first pulse counting means and generating a power output at a frequency relating thereto; and
a synchronous motor for conducting the original image scanning while driven by the power output from said power amplifying means.

10. The system as defined by claim 9 wherein said oscillating means comprises a crystal oscillator or a phase locked loop circuit.

11. The system as defined by claim 9 wherein the original image is projected over said image recording medium by way of a zoom lens and wherein there is provided an analog-to-digital conversion means, cooperating with said zoom lens, for supplying said magnification data in accordance with the zooming ratio of said zoom lens.

12. The system as defined by claim 10 wherein the original image is projected over said image recording medium by way of a zoom lens and wherein there is provided an analog-to-digital conversion means, cooperating with said zoom lens, for supplying said magnification data in accordance with the zooming ratio of said zoom lens.

13. The system as defined by claim 9 further comprising means for adding fine adjustment data to said magnification data, and wherein the sum of said magnification data and said fine adjustment data is coupled to said first pulse counting means.

14. The system as defined by claim 10 further comprising means for adding fine adjustment data to said magnification data, and wherein the sum of said magnification data and said fine adjustment data is coupled to said first pulse counting means.

15. The system as defined by claim 11 further comprising means for adding fine adjustment data to said magnification data, and wherein the sum of said magnification data and said fine adjustment data is coupled to said first pulse counting means.

16. The system as defined by claim 12 further comprising means for adding fine adjustment data to said magnification data, and wherein the sum of said magnification data and said fine adjustment data is coupled to said first pulse counting means.

17. The system as defined by claim 9 further comprising a second pulse counting means coupled to said oscillating means and said first pulse counting means for generating output pulses at a frequency which changes in inverse proportion to the changes in the frequency of the output pulses from said first pulse counting means; a third pulse counting means for counting the output pulses from said second pulse counting means upon reception of a reference pulse generated at a time when said image recording medium passes through a reference position; a memory means having stored therein paper size data and original image scanning data at addresses corresponding to copy sizes and operated by the output pulses from said third pulse counting means; logic means for comparing a signal representative of a preselected paper size received from said image recording apparatus with paper size data from said memory means and generating an output as a function of the comparison; coupling means for transmitting the driving force of said synchronous motor to the original image scanner of the apparatus; and means responsive to the output of said logic means for controlling said coupling means.

18. The system as defined by claim 9 further comprising a further pulse counting means reset by a reference pulse generated at a time when said image recording medium passes through a reference position, thereby counting a program loop; a memory means having stored therein paper size data and original image scanning data at addresses corresponding to copy sizes and operated by the output pulses from said further counting means; logic means for comparing a signal of a preselected paper size received from said image recording apparatus with paper size data from said memory means, and for generating an output as a function of the comparison; coupling means for transmitting the driving force of said synchronous motor to the original image scanner of the apparatus; and means responsive to the output of said logic means for controlling said coupling means.

19. The system as defined in claim 10 further comprising a further pulse counting means reset by a reference pulse generated at a time when said image recording medium passes through a reference position, thereby counting a program loop; a memory means having stored therein paper size data and original image scanning data at addresses corresponding to copy sizes and operated by the output pulses from said further counting means; logic means for comparing a signal of a preselected paper size received from said image recording apparatus with paper size data from said memory means, and for generating an output as a function of the comparison; coupling means for transmitting the driving force of said synchronous motor to the original image scanner of the apparatus; and means responsive to the output of said logic means for controlling said coupling means.

20. The system as defined by claim 18 wherein said oscillating means, said first pulse counting means, said further pulse counting means, said memory means, said logic means, and said means for controlling said coupling means comprise a loop-type of control circuit.

21. The system as defined by claim 19 wherein said oscillating means, said first pulse counting means, said further pulse counting means, said memory means, said logic means, and said means for controlling said coupling means comprise a loop-type of control circuit.

22. A system for controlling, in accordance with operator-selectable magnification data and an operator-selectable paper size signal, an original image scanning for use in a slit exposure type image recording apparatus adapted to project an original image through slit exposure over an image recording medium moving at predetermined speed, comprising:
  a synchronous motor for driving the original image scanner;
  coupling means for transmitting the driving force of said synchronous motor to said original image scanner;
  means for generating pulses;
  means responsive to said pulses and to said magnification data for generating a power signal at a frequency which is a function of said magnification data, said power signal being applied to said synchronous motor;
  memory means for storing paper size data and original image scanning data, said memory means being responsive to a signal derived from said pulses and said magnification data; and
  means responsive to said operator-selected paper size signal and the output of said memory means for generating a control signal that is applied to said coupling means;
  whereby said original image scanning is controlled in accordance with the operator-selected magnification and paper size.

* * * * *